Patented Sept. 21, 1954

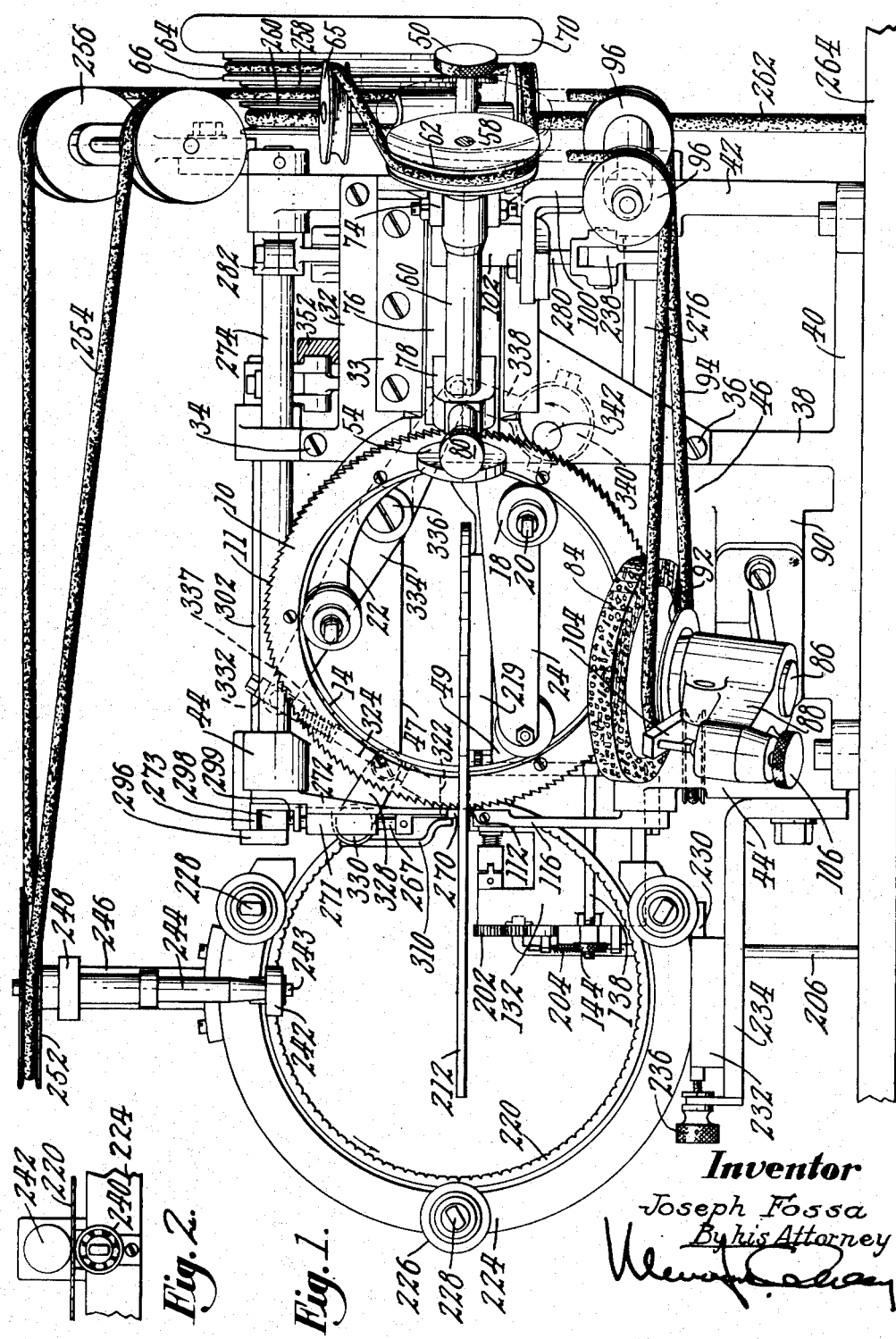

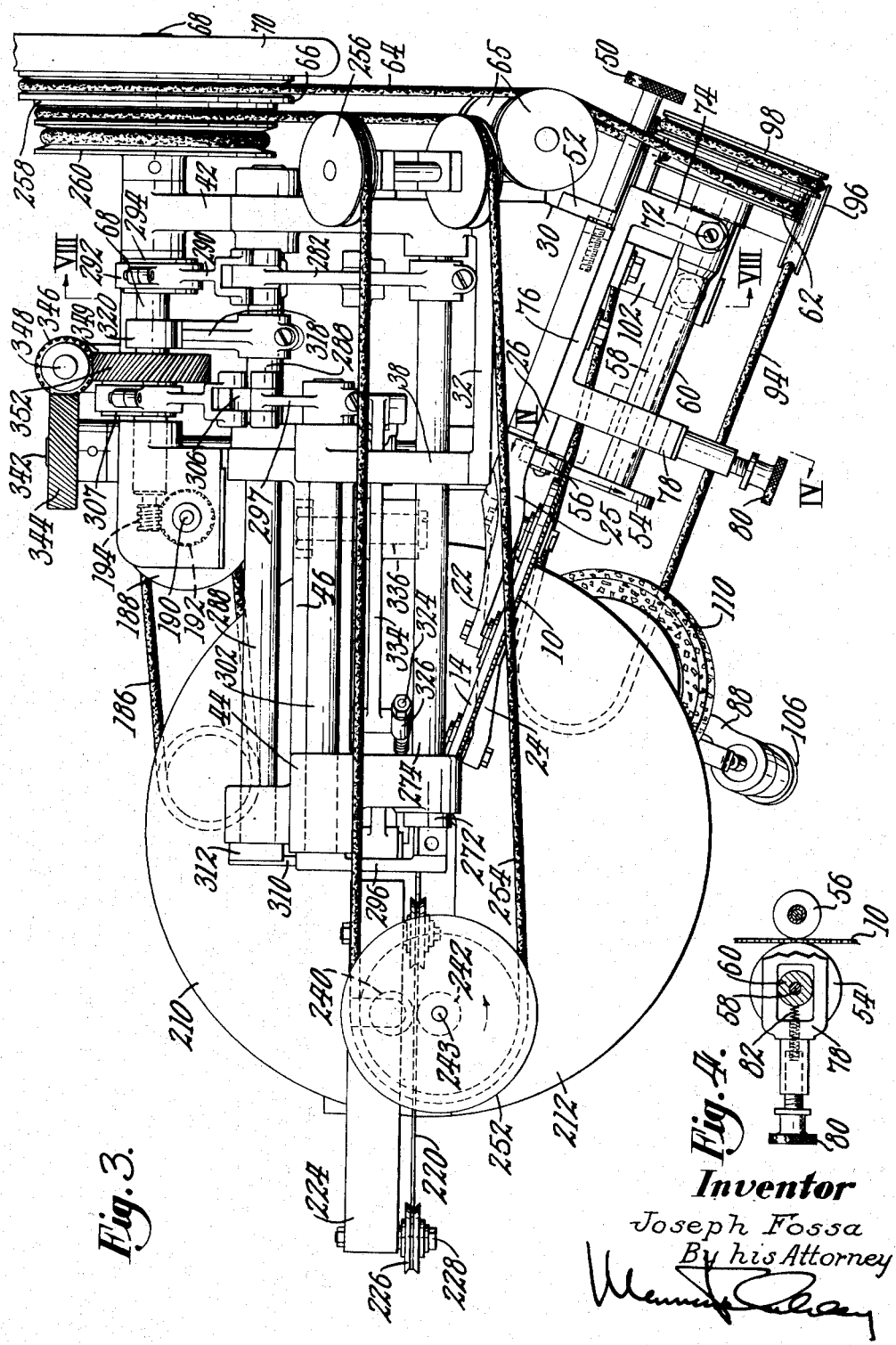

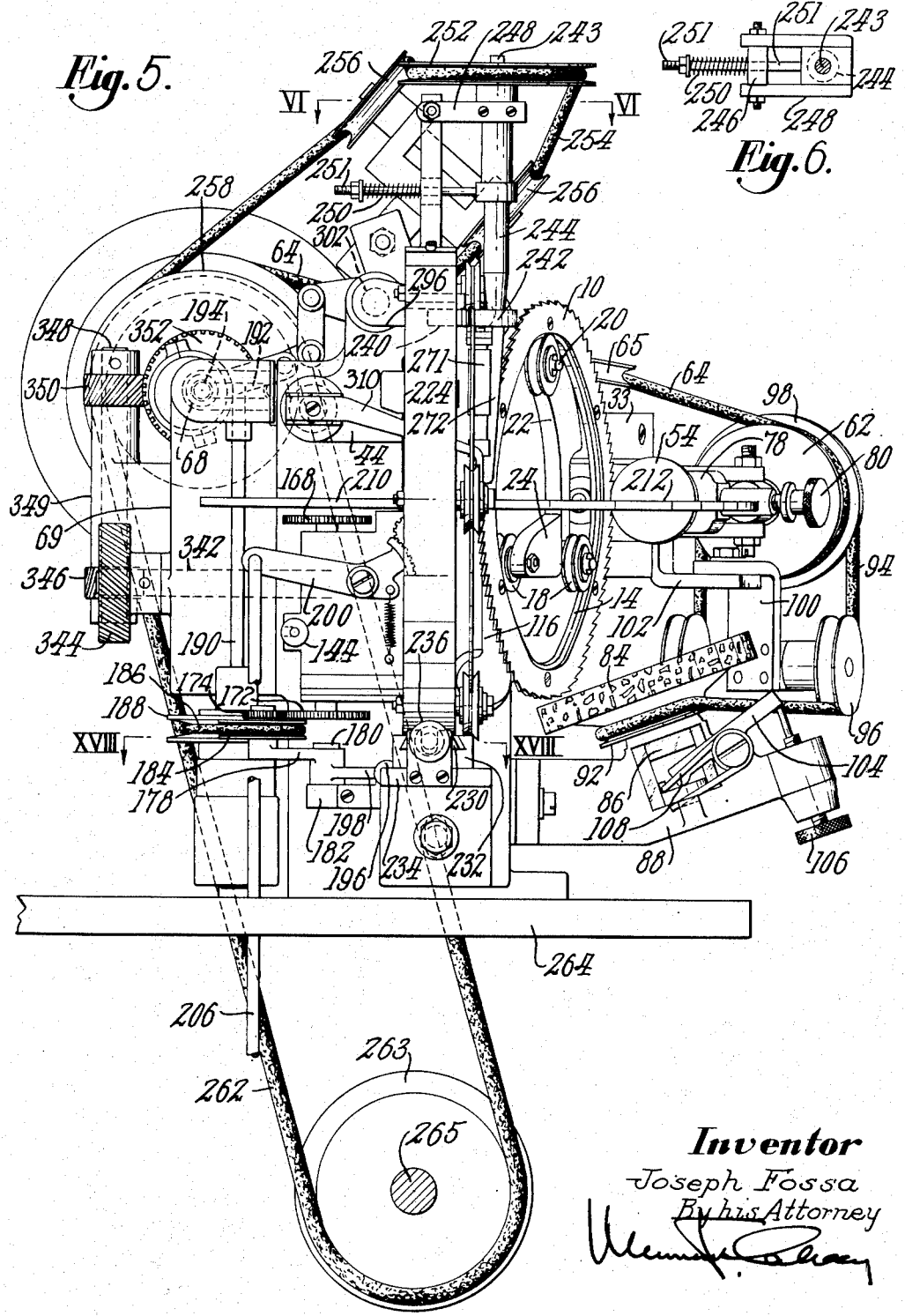

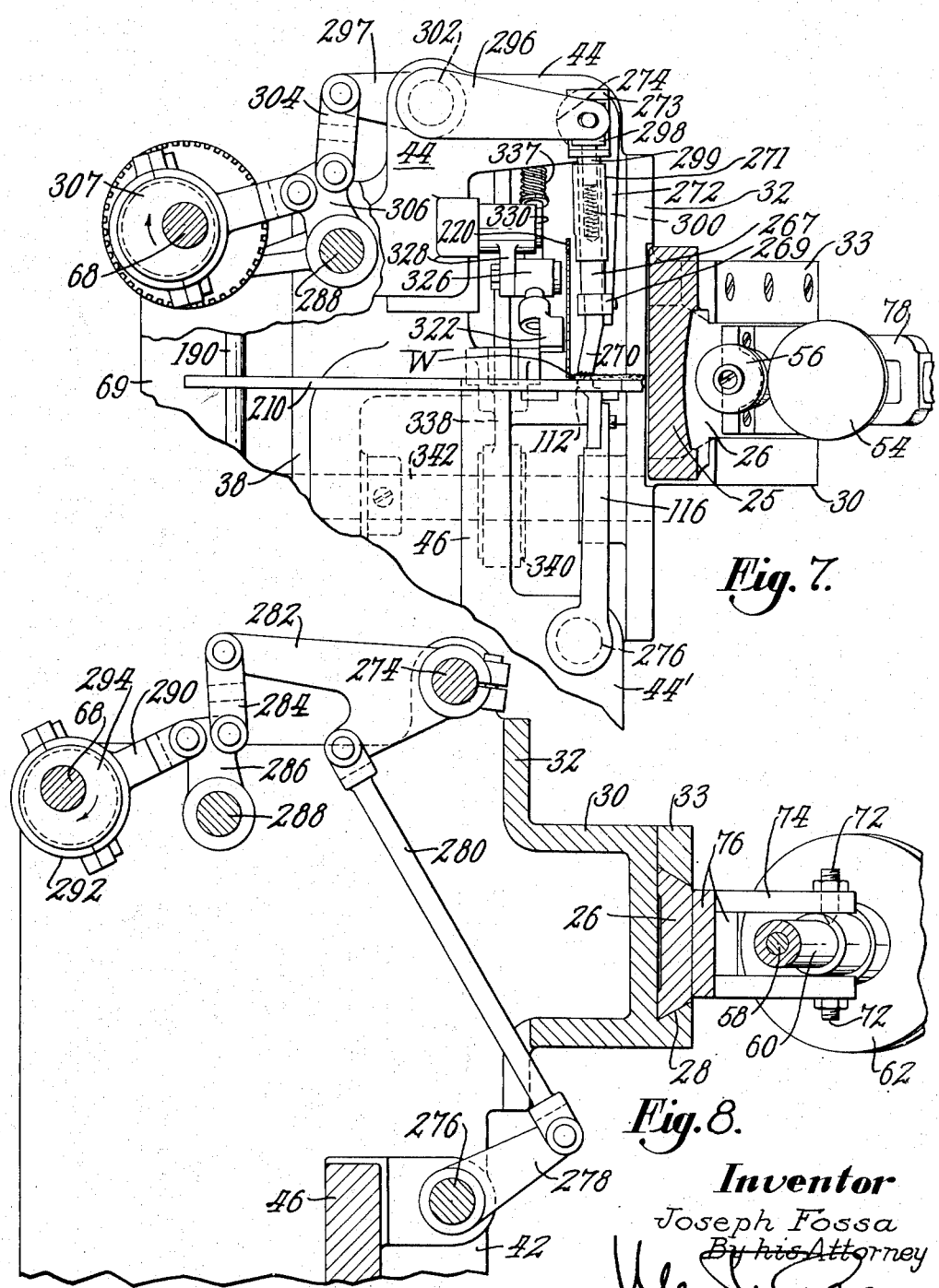

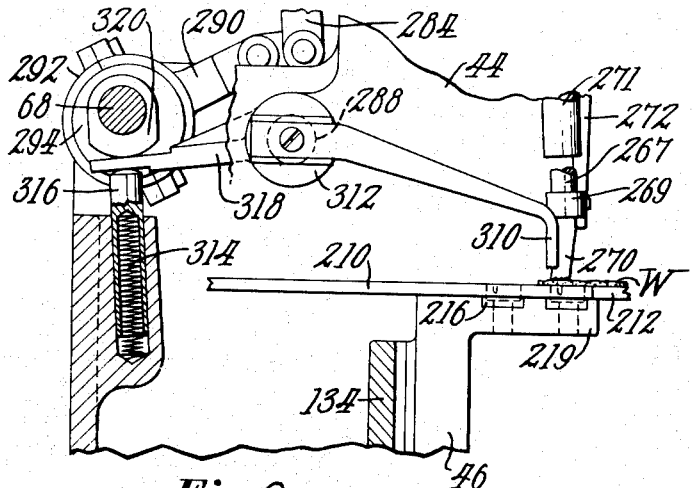
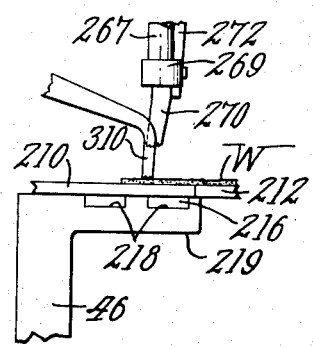
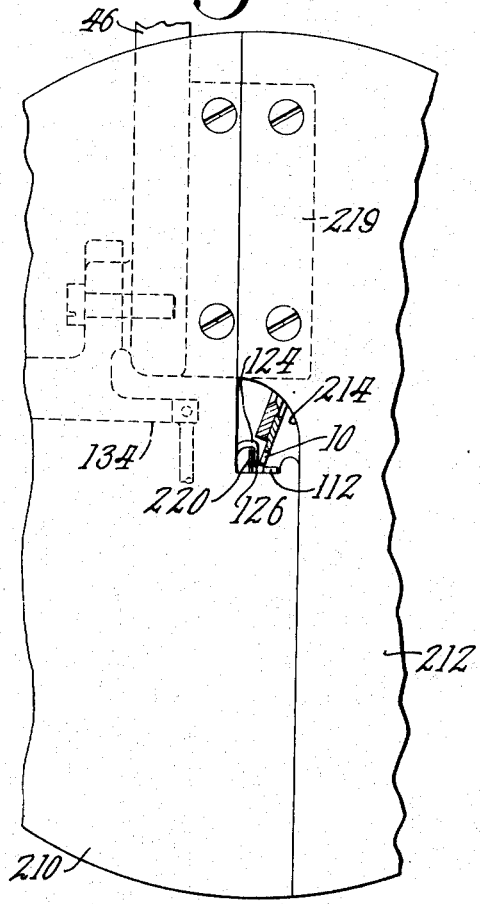
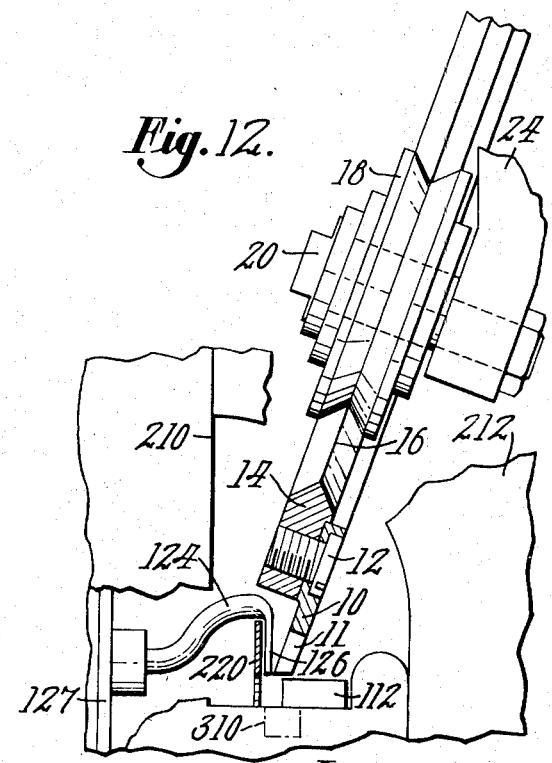

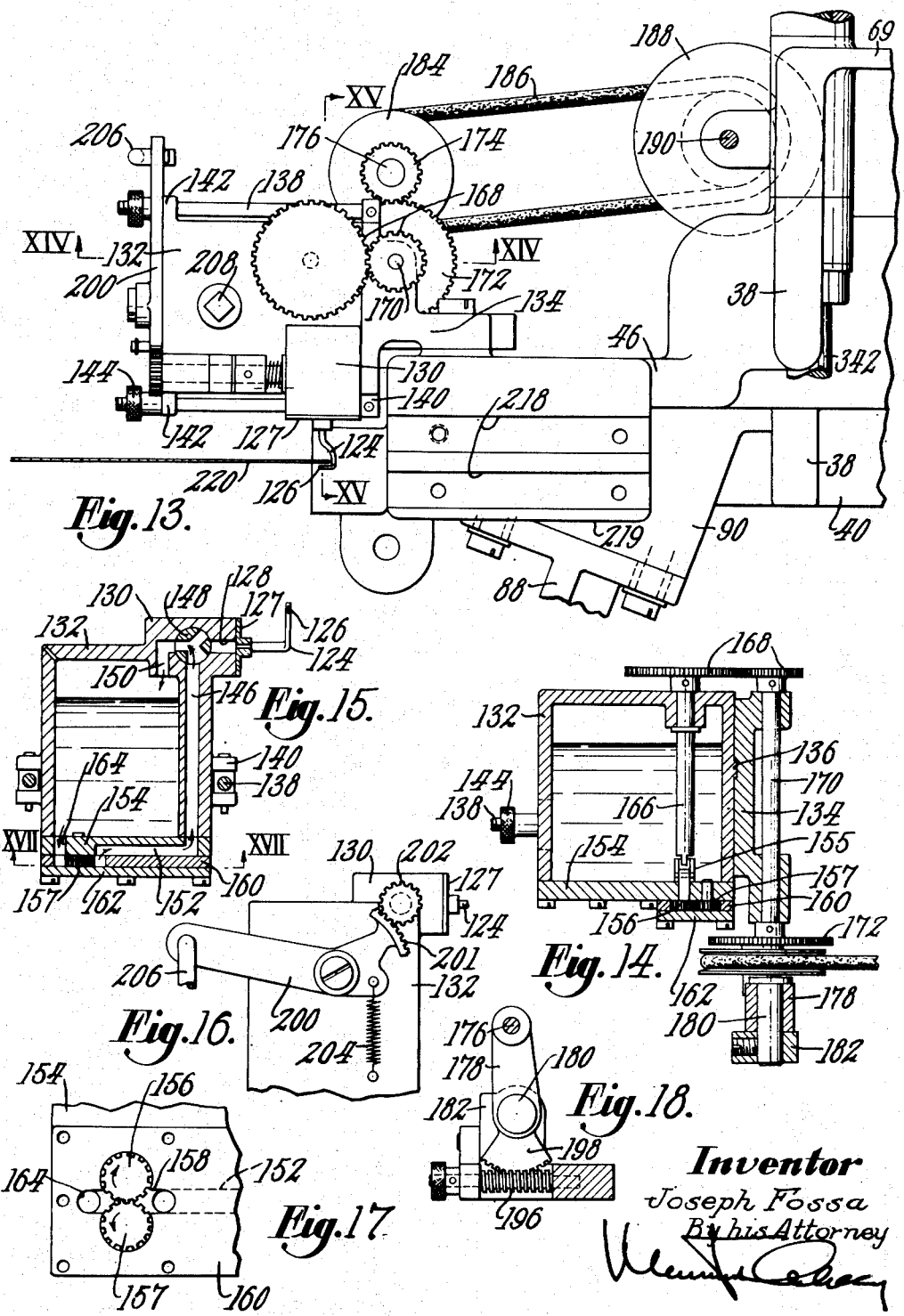

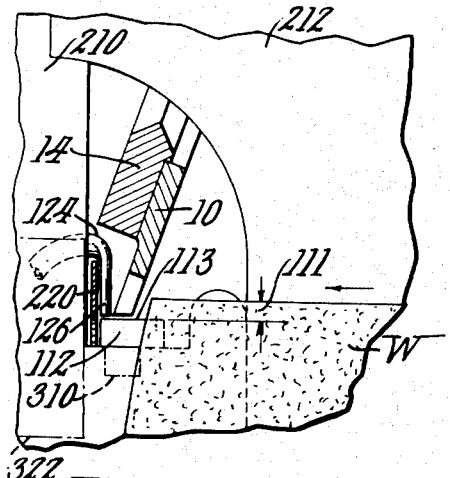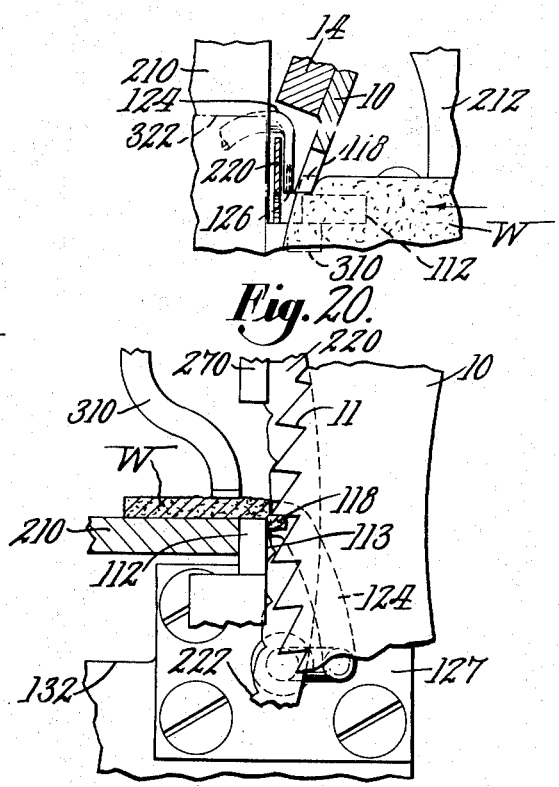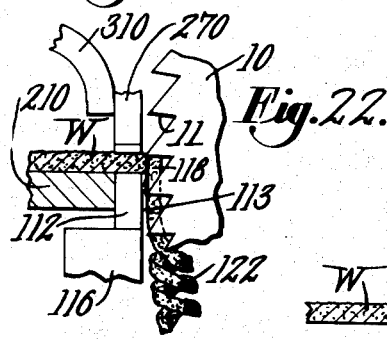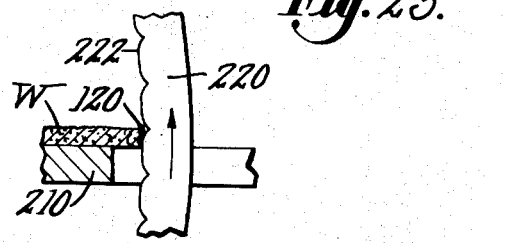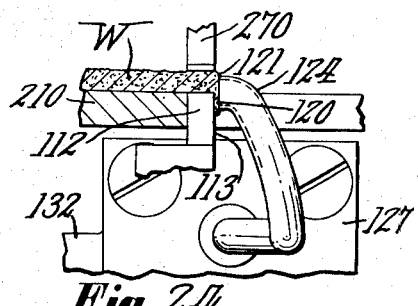

2,689,364

UNITED STATES PATENT OFFICE 2,689,364

MARGIN TREATING MACHINE

Joseph Fossa, South Hamilton, Mass., assignor to United Shoe Machinery Corporation, Flemington, N. J., a corporation of New Jersey Application December 18, 1951, Serial No. 262,233

26 Claims. (Cl. 12—51)

This invention relates to machines for treating the margin of a piece of flexible sheet material and is herein illustrated as embodied in a machine adapted, for example, for finishing the edges of shoe uppers by progressively skiving, cementing, folding and hammering the fold upon successive portions of the edge.

Most of the work done commercially in finishing the edges of pieces by skiving and folding utilizes a very flat skive which requires a substantial width of skiving or of folding margin and hence is much less economical than as if a steep skive had been employed. If a straight steep skive is used then the stubby feather becomes difficult to fold. It has been proposed, however, to use a shoulder skive on such work in which the feather portion to be folded is a fin of nearly uniform thickness and is joined to a steep shoulder on the body of the work. This effects a considerable economy in the amount of leather required for a case of shoes and makes a definite, decorative edge, especially where the folded margin is overlaid on another adjacent piece of work and a seam used for connecting the two.

Accordingly, one object of the invention is to devise an improved machine in which the operations of skiving and folding are both performed, progressively and successively, with a single handling of the work.

One feature of the invention is to be found in the employment of thin, rotary, continually acting tools which may be grouped closely together at the operating point so that work pieces having sharp curves may be readily handled. An arrangement of this sort also enables the use of an extruding nozzle for delivering a quick setting cement at a point between the skiving and folding tools.

A further object of the invention is to provide a novel skiving mechanism acting continually to bend down the margin of the work over the edge of a support and to remove therefrom a portion of the flesh surface to leave a thin feather which, in the case of leather, will be the grain surface thereof and which may be folded back upon the newly formed edge surface with a minimum of difficulty. Preferably, and as illustrated, the skiving tool is provided with a series of teeth upon its outer periphery and is supported by grooved rollers engaging its inner priphery. This tool is rotated by driven means engaging the side of the ring.

This skiving tool leaves the feather turned downwardly in substantial alinement with the edge surface of the work, and, in accordance with another feature of the invention, a cement supplied to a fixed nozzle, is extruded directly upon those surfaces as the feather rests against the side of the work support.

Another feature of the invention relates to a constantly acting folding member of ring-like formation having scallops or corrugations upon its inner periphery to turn over or fold the downturned margin or feather and to wipe it up against the edge surface of the body of the work where it will be held by the cement. Grooved rolls are provided for supporting this folding ring which is positioned in overlapping relation to the skiving ring so that the treated work is passed through the hollow of the folding ring and thence to an oscillatory hammer for pressing the upfolded feather against the edge or the back surface of the work.

These and other features of the invention will best be understood from a consideration of the following specification taken in connection with the accompanying drawings, in which, Fig. 1 is a front elevation of the whole machine;

Fig. 2 is a detail looking up in Fig. 1 at the drive for the folding mechanism;

Fig. 3 is a plan view of the whole machine;

Fig. 4 is a detail section on the line IV—IV of Fig. 3 showing the drive for the skiving mechanism;

Fig. 5 is an end elevation taken from the left in Fig. 1;

Fig. 6 is a section taken on the line VI—VI of Fig. 5;

Fig. 7 is an elevation, partly in section, to show the drive connections for giving up and down movement to a part of the work-feeding mechanism;

Fig. 8 is a vertical section on the line VIII—VIII of Fig. 3 showing the drive for imparting a swinging movement to the work-feeding devices;

Fig. 9 is an elevation, partly in section, to show a presser-foot mechanism;

Fig. 10 is a fragmentary view showing this presser foot in work-engaging position;

Fig. 11 is a horizontal section through the work engaging tools just above the work supporting table;

Fig. 12 is a similar view of these tools on a larger scale;

Fig. 13 is a plan view of the cement mechanism;

Fig. 14 is a vertical section through the cement tank on the line XIV—XIV of Fig. 13;

Fig. 15 is a vertical section at right angles to the latter taken on the line XV—XV of Fig. 13 and cutting through a control valve.

Fig. 16 shows a treadle connection for operating the control valve;

Fig. 17 is a horizontal section on the line XVII—XVII of Fig. 15 taken just below and looking up at the gear pump;

Fig. 18 is a horizontal section on the line XVIII—XVIII of Fig. 5 showing a device for tightening the belt which drives the cement pump;

Figs. 19 and 20 are fragmentary views in plan but with parts in section, similar to Fig. 12, but showing the action of the skiving tool in turning down a piece of work;

Figs. 21 and 22 are fragmentary elevations showing the action of the skiving mechanism on the work;

Fig. 23 is a vertical section through the margin of a piece of work which has been skived;

Fig. 24 shows the relation of the end of the cement nozzle to the skived work;

Fig. 25 illustrates the action of the folding mechanism upon the work as it leaves the cement nozzle;

Fig. 26 is a vertical section through the work as the folded margin is pressed against it by the hammer; and Fig. 27 is a section through a piece of overlay work illustrating how the width of the skive may be adjusted to the thickness of the work.

A narrow skive is cut upon the margin of the work by the saw teeth 11 upon a flat annular blade 10, which teeth are slightly beveled as shown in Fig. 12 because of the relation of the plane of the saw to the path of the work, which latter is in a horizontal direction in that figure. This blade is attached by screws 12 to a somewhat thicker ring 14 having its inner periphery provided with a ridge 16 so that it will run true in a plurality of grooved supporting rolls 18. These are carried by eccentric pins 20 in the upper and lower arms 22, 24 (Figs. 1 and 3) of a bracket 25 having an extension 26 to the right. The extension is provided with beveled edges received in a guideway 28 (Fig. 8) formed in a bulged portion 30 of a bracket 32 and is retained there with the assistance of a removable plate 33.

This bracket 32 is attached by screws 34 and 36 (Fig. 1) to a middle transverse flange 38 of a frame having a base 40. This frame also has a rear transverse flange 42 to which the above bracket is also attached and these two flanges, as well as a front flange 44 (Fig. 3), provide bearings for numerous shafts to be described. The transverse flanges are interconnected by a longitudinal centrally positioned web 46 which at its left end (Fig. 1) is formed of spaced portions 47, 49 providing room between them for passage of the work. The lower portion 49 joins a lower front flange 44'. A thumb screw 50 (Figs. 1 and 3) rotatable in a plate 52 attached to the end of the bulge 30 is threaded in the extension 26 so that the position of the skiving ring with respect to the other operating tools may be readily adjusted.

Rotation of the skiving ring is effected by a friction roll 54 (Figs. 3 and 4) cooperating with a freely rotatable backing roll 56 and the friction roll 54 is mounted upon a shaft 58 journaled in a sleeve 60 and having at its end a drive pulley 62 connected by a belt 64 passing around idlers 65 to a pulley 66 secured to a drive shaft 68, beside a hand wheel 70. This shaft 68 is journaled in bearings provided in the ends of a box-like back plate 69 (Fig. 5) attached to the frame.

The sleeve 60 for the shaft 58 is swingably mounted between pivot screws 72 (Figs. 3 and 8) in arms 74 attached to a plate 76 which is attached to the extension 26 of bracket 25. At its left end this plate has a slotted extension 78 which provides an up-and-down support for the sleeve 60 and which carries a hand screw 80 for adjusting the tension of a spring 82 (Fig. 4) by which the disk 54 is pressed against the blade 10 of the skiver.

For keeping the teeth 11 of the blade 10 sharp, a grinding wheel 84 (Figs. 1 and 5) is rotatable at the top of a pin 86 slidable up and down in an arm 88 attached to a bulged portion 90 (see also Fig. 13) of the central web 46 of the frame. The grinding wheel hub is formed to provide a pulley 92 receiving a belt 94 which runs over idlers 96 to a pulley 98 on the shaft 58 carrying the friction disk 54. The idlers 96 are journaled in the end of an angle iron 100 (Fig. 1) which is supported by another similar iron 102 attached to the plate 76 which supports the sleeve 60 of the shaft 58.

Inasmuch as it is not desired to grind the skiving blade 10 continuously, the pin 86 carrying the grinding disk 84 is arranged for a slight vertical movement by means of a tiltable lever 104. This is pivoted on the arm 88 and has an inner end entering a notch in the pin 86 (Fig. 5). It is normally held with its left end in a depressed position by means of a hand screw 106 but the pin 86 will be raised by means of a spring 108 when the hand screw is retracted. It will be understood that the sharpening action is effected by a rim 110 (Fig. 3) of the grinding wheel engaging the bottom portion of the skiving blade 10.

The action of the skiving device will best be understood from an inspection of Figs. 19 to 23 inclusive from which it will be seen that the margin of a piece of work overhangs the top or principal table surface of a work support 112 which also serves as a lower feed foot attached to the upper end of a swinging arm 116 (Fig. 7), the operation of which will be later described. Beyond this work support, the overhanging margin 111 of the work is deflected downwardly against an auxiliary edge surface 113 of the support 112 by the teeth 11 of the skiving blade 10, the ends of which are accurately spaced a few thousandths of an inch from the inner edge of the support 112. By reason of this fact the teeth are effective to cut away a portion 118 leaving a thin fin 120 and a residual edge surface 121. It is found in practice that owing to the feeding of the work over the upper end of the support 112, the removed portion 118 leaves the work in the form of a spiral chip 122 as shown in Fig. 22. The thickness of the fin 120 depends upon the adjustment of the position of the skiving blade by means of the hand screw 50 acting upon the supporting bracket 25 for the blade, but the length of the fin depends upon the width of the margin 111 of the work and is long enough to cover the edge surface 121 of the work when it is folded back into position.

Before the fin is folded and while it is still turned down against the surface 113 by the skiving mechanism as shown in Fig. 24, a coating of cement is applied to the edge surface 121 of the work and to the inner surface of the fin 120 by means of a nozzle 124 having a slit-like opening in a thin end portion 126 (Fig. 19). This nozzle is supported by means of a plate 127, screw attached opposite the outlet passage 128 (Fig. 15) to a valve casing 130 formed as an integral part of a cement tank 132.

This tank 132 is detachably secured to the arms of a T-shaped bracket 134 (Fig. 13) which in turn is mounted on the side face of a portion of the central web 46 of the frame. This bracket is provided with a transverse horizontal groove 136 (Fig. 14) to receive a corresponding rib on the outside of the tank 132 and the tank is held in position thereon by swinging bolts 138 (Fig. 13) pivotally mounted between lugs 140 on the flanges of the bracket 134 and adapted to be received between ears 142 (Fig. 13) integral with the outer portion of the tank. The tank is clamped in position by thumb nuts 144 threaded on the bolts 138.

The tank has a vertical passage 146 adapted to be brought into communication with the outlet passage 128 by turning a 3-way valve 148 or at other times to be connected directly to the tank by a by-pass return 150. The vertical passage forms the outlet for a delivery passage 152 in a plate 154 which closes the bottom of the tank. In this plate there is journaled a shaft 155 attached to one gear 156 of the gear pump and a shaft integral with the other gear 157. These gears are positioned in a recess 158 formed in a pump plate 160 which together with a bottom plate 162 is secured to the cover plate 154.

The latter plate 154 has an inlet passage 164 connecting the tank with the inlet side of the recess 158 and when the meshing gears are rotated, cement from the tank is pushed out through the delivery passage 152 to the nozzle. Rotation of these gears is effected by a shaft 166 journaled in the tank and connected by gears 168 to a vertical shaft 170 journaled in the T-shaped bracket 134. The latter shaft 170 has a bottom gear 172 meshing with a driving gear 174 which is on a short shaft 176 carried at the outer end of a lever 178 swingable upon a stud 180 (Figs. 5 and 18) which is attached to an ear 182 attached to the T-shaped bracket 134.

Associated with this shaft 176 is a belt pulley 184 connected by a belt 186 to a pulley 188 which is secured to a vertical shaft 190 (Fig. 5) journaled in suitable extensions of the transverse middle flange 38 of the frame. At the top of the shaft 190 there is a worm gear 192 (Figs. 3 and 5) meshing with a worm 194 on the end of the drive shaft 68. Provision is made for tightening the belt 186 by means of a screw 196 (Fig. 18) meshing with the segment 198 on the end of the lever 178.

Swingable on the end of the tank 132 is a lever 200 (Fig. 16) having a segment 201 meshing with a gear 202 attached to the control valve 148. This lever 200 is normally drawn to a position to bring the valve to the point shown in Fig. 15 by means of a spring 204, but the valve may be turned to connect the vertical passage 146 to the outlet passage 128 by the depression of a treadle (not shown) connected to a treadle rod 206 which is attached to the end of the lever 200. The tank is provided with a filling opening closed by a plug 208 (Fig. 13).

For the convenience of the operator, the body of the work may be rested upon a table formed in two pieces 210 and 212 (Fig. 11) having properly shaped meeting edges to provide an opening 214 for the working tools. These pieces are provided with ribs 216 received in grooves 218 of a flange 219 extending outwardly from the web 46 of the frame.

After cement has been applied to the fin 120 the work is subjected to the action of a folding ring 220 having rounded humps or corrugations 222 upon its inner circumference. These act in the manner suggested in Fig. 25 to turn up the fin and to press it against the edge surface 121 of the work. This ring is carried by a C-shaped bracket 224 (Fig. 1) having a series of grooved disks 226 carried upon studs 228 in the bracket 224, said studs being provided with eccentric portions, similar to those shown in Fig. 12 in connection with the skiving blade. The bottom of the bracket is welded to a plate 230 having tapered edges (Fig. 5) and slidable within a correspondingly shaped groove of a block 232 which is secured to an arm 234 extending outwardly from the end of the base portion of the frame. An adjusting screw 236 is provided to bring the active portion of this folding ring 220 into exactly the desired relation to the edge of the lower feed foot 112 as shown in Fig. 19. This ring is constantly rotated in a counterclockwise direction as seen in Fig. 1 by gripping rolls 240 and 242.

The first of these is freely rotatably upon ball bearings just beneath the upper portion of the C-shaped bracket 224 while the roll 242 is on a shaft 243 which is power driven. To this end it is mounted in a sleeve 244 carried on a pedestal 246 which is attached to the top of the C-shaped bracket. The sleeve 244 has secured to it arms 248 (Figs. 5 and 6) pivoted at the top of the pedestal while the sleeve is drawn inwardly to cause the driving roll 242 to grip the folding ring by means of a spring 250 (Fig. 5) on a rod 251. At the top of the sleeve 244 the shaft 243 carrying the roll 242 is provided with a pulley 252 around which there is a belt 254 extending over idlers 256 to another pulley 258 (Fig. 1) on the drive shaft 68. Still a third pulley 260 also secured to the drive shaft 68 has a driving belt 262 extending to a pulley 263 (Fig. 5) on a driven shaft 265 beneath the bench 264 on which the machine is mounted.

During this operation of the skiving, cementing and folding tools, the work is carried forward continually by means of a four-motion feed mechanism (Figs. 1, 7 and 8) which comprises an upper feed foot 270 coacting with the lower foot or work support 112 and the swinging arm 116. The upper feed foot 270 (Figs. 1 and 7) is held by a clamp 269 on the lower end of a rod 267 slidable in a hollow cylindrical portion 271 of a swinging carrier arm 272. This rod has a U-shaped top end 273 which bears against the arm 272 and keeps the rod from turning and it is recessed to receive a spring 300. The arm 272 is supported at the outer end of an upper swing shaft 274 while the lower arm 116 is supported at the outer or left end of a lower swing shaft 276.

The swing shafts are journaled in the frame flanges 38 and 42 and also in the upper and lower end flanges 44, 44'. The lower shaft 276 is provided with an arm 278 (Fig. 8) connected by a link 280 to an arm 282 attached to the upper swing shaft 274. An oscillatory movement is imparted to these arms by a link 284 connected to a rocker arm 286. This rocker arm 286 is loose upon a pivot shaft 288 extending between the frame flanges 38 and 42 and the rocker is arranged to be moved to and fro by a pitman 290 having a strap 292 around an eccentric 294 on the drive shaft 68.

Combined with its oscillatory side-to-side movement, the upper feed foot 270 is intermittently pressed into gripping engagement with the work by means of a crank arm 296 (Fig. 7) connected to a block 298 which is received in the recess of the U-shaped top end 273 of the rod 267 and the block has a depending pin 299 pressing against the spring 300 contained in the recess of the rod 267 to cause the foot 270 to grip the work. The foot is lifted from the work by engagement of the block 298 with the upper side of the U-shaped top end 273. The crank arm 296 is mounted on the forward end of a crank shaft 302 (Fig. 3) which is journaled in the flanges 38 and 44 and the crank arm has an extension 297 connected by a link 304 to another rocker 306 freely swingable upon the shaft 288 and arranged to be oscillated in the manner described in connection with the rocker arm 286 by means of an eccentric 307 also secured to the drive shaft 68.

As is customary with four-motion feed mechanisms, the machine is provided with a presser foot 310 (Figs. 1, 9 and 10) secured in a grooved disk 312 at the forward end of the rocker shaft 288 and this presser foot is moved downwardly into holding relation with the work as shown in Fig. 10 as the upper feed foot 270 is raised. The depression of the presser foot is accomplished by means of a spring 314 bearing against a plunger 316 which rests on the under side of an arm 318 which is attached to the rocker shaft 288 (Fig. 3) at a point between the two rocker arms 286, 306.

Just above the end of the arm 318 (Fig. 9) is a cam 320 which is on the drive shaft 68 and which, in the position shown in Fig. 9, is arranged to depress the arm against the action of the spring 314 to raise the presser foot 310. Inasmuch as eccentrics 294 and 307 are on the same shaft as the cam 320 the proper time relation of the various parts of the feed mechanism is assured. Thus, at the end of a feed movement, the presser foot 310 holds the work W against the table 210 (the point of contact being shown in Figs. 19 and 20) while the upper feed foot 270 is raised, swung back and again depressed against the work. The presser foot then lifts while the feed feet 112, 270 grip the work and swing with the arms 116 and 272 to feed the work forward.

To hammer down the free end of the fin and bring it into tight engagement with the rear face of the work, there is provided, as shown in Fig. 26, a hammer 322 which is attached to the lower end of a rod 324 slidable in a block 326 (Fig. 7) which is pivoted at the end of an arm 328 swinging from a fixed stud 330 carried by a flange projecting to the left (Fig. 1) from the upper end frame flange 44. The upper end of the rod 324 is slidable (Fig. 1) in a block 332 pivotally attached to the upper end of a lever 334 which is mounted to swing on a stud 336 secured to the inner web 46 of the frame. A spring 337 on the rod 324 is interposed between block 332 and a shoulder on the rod so that the hammer is pressed yieldingly against the work. The lower end of this lever is pivoted to a pitman 338 associated with an eccentric 340 which is on a transverse shaft 342 journaled in the middle flange 36. This shaft 342 has at the back of the machine (Figs. 3 and 5) a spiral gear 344 meshing with a gear 346 at the lower end of an upright shaft 348 at the upper end of which there is another gear 350 meshing with a spiral gear 352 on the drive shaft. The upright shaft 348 is journaled in a lug 349 (Fig. 5) extending rearwardly from the back plate 69.

In the operation of the machine, the work W is placed by the operator upon the tables 210 and 212 with its margin 111 overhanging the edge of the support 112 by an amount approximating the thickness of the work and the work is maintained in this relationship as it is guided by the operator. The projecting margin 111 is then skived by the teeth of the skiving blade 10 which, because of its predetermined spacing from the side of the support 112 and the disposition of its axis at a small angle with the edge of the work support, causes the peripheral cutting edges to enter the upper surface and emerge from the edge surface, thereby removing a major portion of the margin of the leather and leaving the thin fin 120. This fan as it is released by the skiving blade is given a coating of cement by the thin portion 126 of the nozzle 124 whereupon the fin is turned upwardly by the action of the folding ring 220 and is pressed against the end surface 121 of the work which was also coated by the nozzle. The feeding of the work is accomplished by the four-motion feed mechanism previously described and as the work leaves the folding ring 220, the fin is hammered over against the rear surface of the work by the hammer 322 thus forming a finished edge with a minimum of waste of leather and, doing it progressively at a good rate of speed, sharp curves in the work can be successfully treated because of the close grouping of the tools.

In some work overlays are found desirable for style or other reasons and in that case it would be possible to treat one margin of the overlay O (Fig. 27) before it is placed upon the work W' and then to treat the combined margins, as at the right of Fig. 27, to provide a finished surface 402 having a lip which extends over both edge surfaces of work with its length regulated by the operator in the presentation of the work to the machine.

Having thus described my invention, what I claim as new and desire to secure by Letters Patent of the United States is:

1. In a machine for treating the margin of a piece of sheet material, a rotary tool to skive the margin, a cementing nozzle adjacent thereto arranged to apply cement directly from the nozzle to the skived surface of the work, another rotary tool beside the cementing nozzle to fold the skived margin, and means for feeding a piece of work past said tools one after another.

2. In a machine for treating the margin of a piece of sheet material, a rotary continuously acting skiving tool, a rotary continuously acting folding tool, means between the two for applying cement to the skived margin before it is folded, means for supporting said tools in closely adjacent positions, and means for feeding the work past the tools.

3. In a machine for treating the margin of a sheet of flexible material to skive the margin and immediately fold it, rotary tools for successively acting upon the margin, one of said tools being a hollow ring, and a feeding mechanism for gripping the work along a path passing within the hollow tool.

4. In a machine for treating the margin of a piece of flexible material, continually acting driven tools for treating the margin at successive points to skive the margin and to fold it, and means separate from the folding tool for continually applying cement to the margin which is produced by the skiving tool before it reaches the folding tool.

5. In a machine for treating the margin of a piece of sheet material, a work support having a top surface and an edge surface angularly related thereto, a rotary tool operative to turn the margin down over said edge surface, means to apply cement to the down-turned portion, and a ring-like tool positioned with its inner circumference drawing the down-turned margin upwardly into engagement with a portion of the body of the work to make a folded edge.

6. In a machine for treating the margin of a piece of flexible material, a work support, means for feeding the work across said support, a rotary skiving tool engaging a margin of the work to thin its margin and at the same time to turn the thinned margin downwardly, and a ring-like folding tool surrounding the work and having a portion of its inner circumference positioned to turn the thinned margin through 180° so that it extends upwardly.

7. In a machine for treating the margin of a piece of flexible material, a work support, means for feeding the work across said support, a rotary skiving tool engaging a margin of the work to thin its margin and to turn the margin downwardly, and a ring-like folding tool surrounding the work and having a portion of its inner circumference positioned to turn the thin margin through 180° so that it extends upwardly, and a hammer for pressing the upstanding margin against the work.

8. In a machine for treating the margin of a piece of flexible material, a work support, a ring-like skiving tool having a corrugated outer periphery, a bracket having means for supporting said tool by engagement with its inner periphery, a ring-like folding tool having a corrugated inner periphery, and a C-shaped bracket on the machine having guiding and supporting rolls engaging the outer periphery of said folding tool to support the folding tool with its outer portion in overlapping relation to said skiving tool so that the inner periphery of the folding tool acts upon the margin treated by the skiving tool to fold it upon the work.

9. In a machine for treating the margin of a sheet of flexible material, a work support having a principal supporting surface and also an adjacent auxiliary surface angularly related to said principal surface, and a rotary tool for bending the margin of the work down against the auxiliary surface, the periphery of said tool being movable in a circular path intersecting the margin of the work and having peripheral cutting members arranged to tear therefrom a portion of the material which rests against the auxiliary surface.

10. In a machine for treating successive portions of the margin of a piece of flexible material, a work support having an edge extending in the direction of movement of the work, a tool rotatable about an axis making a small angle with the edge of the work support, said tool being flat and having spaced teeth the cutting edges of which lie in the periphery thereof, the position of said axis with respect to the work support being such that the cutting elements of the periphery of the tool will enter the upper surface of the work overlapping the edge of said support and emerge from the edge surface thereof thereby to remove a segment of the material leaving a thin fin projecting from the body of the work.

11. In a machine for treating the margin of a sheet of flexible material, a table having an edge along which is fed the inner boundary of the margin of a work piece to be skived, a cutter having a plurality of spaced cutting edges, said cutter being mounted to rotate so as to cause said cutting edges to move past said edge in proximity to and crosswise of the plane of said table whereby the margin of the work is bent around said edge, and means for supporting the bent margin of the work within the path of said cutting edges, the work engaging surface of said supporting means being disposed in proximity to and extending in substantially the direction of movement of said cutting edges whereby a thin fin is formed upon the margin of the work.

12. In a machine for treating the margin of a sheet of flexible material, a work support comprising an edge surface arranged to support the margin of a work piece to be skived and a table disposed at an angle to said edge surface for supporting the work inside the margin thereof, said edge surface and table meeting at a corner around which the margin of the work is bent, and a tool comprising a plurality of spaced cutting edges, said tool being mounted to rotate in such a direction that its cutting edges are moved crosswise of the plane of said table in proximity to its corner and substantially parallel to said edge surface.

13. In a machine for treating the margin of a sheet of flexible material, a work support, a rotary tool having spaced cutting edges, said work support comprising a table arranged to support a work piece inside the margin thereof against movement along the path of the cutting edges of said tool, said work support also comprising an edge surface arranged to support the margin of the work throughout the area swept by said cutting edges against the outward pressure exerted by said tool upon the work.

14. In a machine for treating the margin of a sheet of flexible material, a work support and a rotary tool having spaced cutting edges, said work support comprising a table arranged to support the work inside the margin thereof, said tool being munted to rotate in such a direction that its cutting edges are moved crosswise of the plane of said table and a corner thereof whereby the margin of the work is bent around said corner, said work support also having an edge surface disposed in juxtaposition and substantially parallel to the path of said cutting edges whereby the margin of the work is supported throughout the swath cut by said cutting edges.

15. In a machine for treating the margin of a sheet of flexible material, a support for that portion of the work to be skived which is inside its margin, a cutter having a plurality of cutting edges movable crosswise of the plane of said support in proximity to a corner thereof thereby to cause the margin of the work overlapping said corner to be bent around it, and means for supporting the bent margin of the work at an angle to the plane of said support throughout the width and length of the swath made by said cutting edges across the margin of the work.

16. In a machine for treating the margin of a sheet of flexible material, a table arranged to support a work piece to be skived inside its margin, a cutter having spaced cutting edges movable crosswise of the plane of said table and into proximity to its edge thereby to cause the margin of the work which overlaps said edge to be bent around it, and means for supporting the bent margin of the work at an angle to the plane of said table throughout the width and length of the swath of said cutting edges and within the path thereof.

17. In a machine for treating the margin of a sheet of flexible material, a rotary toothed cutter and a work support comprising a table having an edge extending laterally of and in proximity to the teeth of said cutter, said cutter being mounted to rotate in such a direction that its teeth move crosswise of the plane of said table and its edge whereby the margin of a work piece on said table is bent around its edge, said support also comprising a surface disposed at an angle to said table and intersecting said edge, said surface also being arranged to support the entire width of the bent margin of the work and the length of the margin of the work which is engaged by said cutting edges.

18. In a machine for treating the margin of a piece of flexible material, a support for the work, and a multitoothed rotary tool for bending the margin of the work over the edge of said support, said teeth being movable in a path spaced a predetermined distance from the edge of the work support and operating to remove a segment of the bent margin leaving a thin fin projecting from the body of the work.

19. In a machine for treating the margin of a piece of flexible material, a work support, a continually acting rotary tool having a plurality of cutting members, said tool being operative to bend the margin over the edge of said work support and to remove a segment of the material leaving a thin fin projecting from the body of the work, and means to adjust the distance between said work support and said rotary tool to determine the thickness of said fin.

20. In a machine for treating a margin of a piece of flexible material, a work support, a ring-like rotary skiving tool acting continually upon a portion of the work projecting beyond said work support, a support for the tool engaging the inner circumference thereof, and cooperating means, one of which is driven, gripping the sides thereof to rotate said tool.

21. In a machine for treating a margin of a piece of flexible material, a work support, a ring-like tool for treating the portion of the work overhanging said support, said tool having a series of teeth upon its outer periphery, a supporting bracket upon said machine, said bracket being provided with a series of grooved rolls engaging the inner periphery of said ring-like tool for supporting it, a driven roll engaging the side face of said tool to rotate it, and means for adjusting the position of said bracket with respect to said work support without disturbing the relation of the driving roll to the tool.

22. In a machine for treating a margin of a piece of flexible material, a work support, a ring-like tool for treating the portion of the work overhanging said support, said tool having a series of teeth upon its outer periphery, a supporting bracket upon said machine, a series of grooved rolls engaging the inner periphery of said ring-like tool for supporting it, said bracket having rotatable studs with eccentric portions for supporting said grooved rolls to permit adjustment of the positions of the rolls to fit the inner periphery of the tool, a driven roll engaging the side face of said tool to rotate it, and means for adjusting the position of said bracket with respect to said work support without disturbing the relation of the driving roll to the tool.

23. In a machine for treating the margin of a piece of flexible material comprising a work support having a principal surface and an auxiliary surface angularly related to said principal surface, means for forming a thin fin projecting from the body of the work and for turning it down therefrom substantially in alinement with the edge surface of the body of the work, and means for applying cement to said edge surface and to said supported fin.

24. In a machine for treating the margin of a piece of flexible material, a work support having top and side angularly related surfaces, a driven skiving tool having a work treating portion spaced a predetermined distance from said angularly related side surface and operative to cut away a segment of the body of the work leaving a thin fin turned down over said surface in substantial alinement with the residual edge of the body portion, a nozzle for delivering cement both to the edge of the body portion and the fin, and means for extruding cement through said nozzle as the work is carried past it.

25. In a machine for treating the margin of a piece of flexible material, a work support, means for feeding the margin of the work progressively over said work support, a folding tool comprising a hollow, ring-like member supported with its inner circumference in position to engage and fold the margin of the work, and means for rotating said tool about an axis generally parallel to the path of feeding movement.

26. In a machine for treating the margin of a piece of flexible material, a work support, means for feeding the margin of the work progressively over said work support, and a folding tool comprising a ring-like member supported with its inner circumference in position to engage and fold the margin of the work, said tool having a series of scallops on its inner circumference.

References Cited in the file of this patent

UNITED STATES PATENTS

| Number | Name | Date |
|---|---|---|
| Re. 12,535 | Harmon | Oct. 2, 1906 |
| 731,566 | Harmon | June 23, 1903 |
| 1,281,654 | Prime | Oct. 15, 1918 |
| 2,144,722 | Hooper | Jan. 24, 1939 |
| 2,301,202 | Dixon | Nov. 10, 1942 |
| 2,328,077 | Jorgensen | Aug. 31, 1943 |
| 2,347,674 | Dow et al. | May 2, 1944 |
| 2,354,216 | MacKenzie | July 25, 1944 |
| 2,491,185 | Kamborian | Dec. 13, 1949 |

FOREIGN PATENTS

| Number | Country | Date |
|---|---|---|
| 414,644 | Germany | Nov. 3, 1925 |